(12) United States Patent
Agawa et al.

(10) Patent No.: US 7,399,333 B2
(45) Date of Patent: Jul. 15, 2008

(54) FILTER ELEMENT AND PROCESS FOR PRODUCING THE SAME

(75) Inventors: Setsuo Agawa, Nishitama-gun (JP); Koji Nakanishi, Nishitama-gun (JP); Yoshinori Ichihara, Shimotsuga-gun (JP)

(73) Assignee: Nittetsu Mining Co., Ltd., Tokyo (JP)

( * ) Notice: Subject to any disclaimer, the term of this patent is extended or adjusted under 35 U.S.C. 154(b) by 519 days.

(21) Appl. No.: 10/540,469

(22) PCT Filed: Oct. 21, 2003

(86) PCT No.: PCT/JP03/13433

§ 371 (c)(1),
(2), (4) Date: Jun. 23, 2005

(87) PCT Pub. No.: WO2004/064981

PCT Pub. Date: Aug. 5, 2004

(65) Prior Publication Data

US 2006/0086655 A1    Apr. 27, 2006

(30) Foreign Application Priority Data

Dec. 24, 2002   (JP) ............................. 2002-372978

(51) Int. Cl.
*B01D 46/24*    (2006.01)
*B01D 39/16*    (2006.01)

(52) U.S. Cl. .............................. 55/523; 55/486; 55/487; 55/524; 55/528; 55/DIG. 5; 210/503; 210/504; 210/506; 264/628; 264/DIG. 48

(58) Field of Classification Search .................. 55/486, 55/497, 523, 524, 528, DIG. 5, 487; 264/628, 264/DIG. 48; 210/503, 504, 506
See application file for complete search history.

(56) References Cited

U.S. PATENT DOCUMENTS 5,080,847 A  *  1/1992  Hazeyama ............... 55/DIG. 5
5,508,095 A     4/1996  Allum et al.

(Continued)

FOREIGN PATENT DOCUMENTS

EP    1 005 891 A1   6/2000

(Continued)

OTHER PUBLICATIONS

Office Action issued on Dec. 12, 2007, for Japanese Patent Application Publication No. 2002-372978.

*Primary Examiner*—Jason M Greene
(74) *Attorney, Agent, or Firm*—Sughrue Mion, PLLC

(57) ABSTRACT

The present invention provides a filter element and a method for producing the same, which do not generate pollution during waste disposal, can be easily produced, improve the pressure loss and reduce the production cost. The filter element and the method for producing the same are characterized in that ultrahigh molecular weight polyethylene fine powders, which have an average molecular weight of 3,000,000 to 11,000,000 and a bulk specific gravity of 0.15 to 0.29, are the aggregate of primary particles, and are shaped to have voids of 1 to 5 μm in a part where the primary particles are connected, are filled into the pores on the surface of a filter element base made of an open-cell porous molded body prepared by heating and sintering synthetic resin powders, a non-woven fabric or a felt.

4 Claims, 9 Drawing Sheets

U.S. PATENT DOCUMENTS

| | | | |
|---|---|---|---|
| 5,547,481 A * | 8/1996 | Herding et al. | 55/523 |
| 5,804,074 A | 9/1998 | Takiguchi et al. | |
| 6,165,243 A * | 12/2000 | Kawaguchi et al. | 55/524 |
| 6,183,530 B1 * | 2/2001 | Herding et al. | 55/523 |
| 6,331,197 B1 * | 12/2001 | Herding et al. | 55/523 |

FOREIGN PATENT DOCUMENTS

| | | |
|---|---|---|
| JP | 02-212132 A | 8/1990 |
| JP | 5-285323 A | 11/1993 |
| JP | 8-155233 A | 6/1996 |
| JP | 8-155233 * | 6/1999 |
| JP | 11-347323 A | 12/1999 |
| JP | 2003-126627 A | 5/2003 |

* cited by examiner

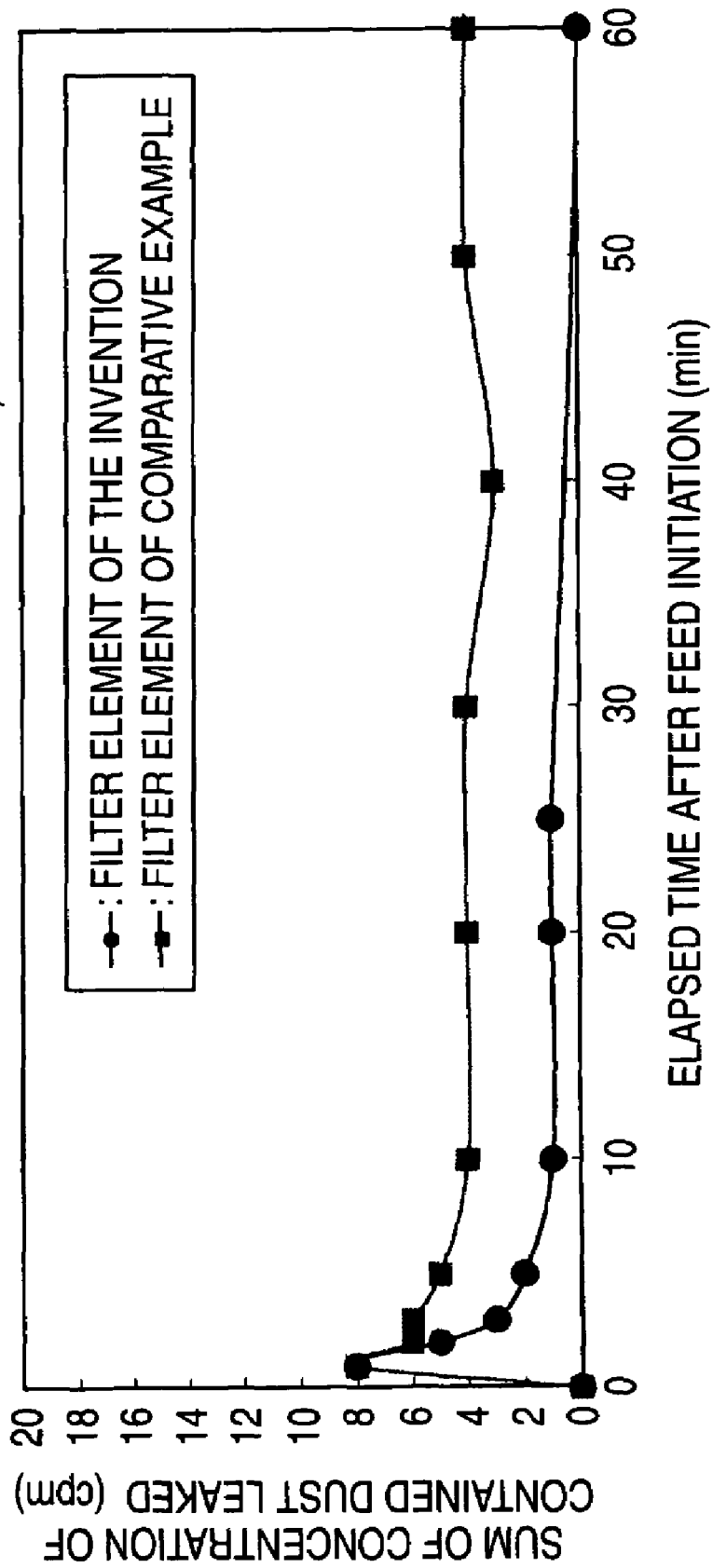

FILTER ELEMENT AND PROCESS FOR PRODUCING THE SAME

FIELD OF THE INVENTION

The present invention relates to a filter element used for separating and collecting solid particles and removing them from a fluid, and a method for producing the same.

BACKGROUND ART

A filter element for separating solid particles from a gaseous or liquid medium is disclosed in Patent Document 1 (JP-A No. 61-502381) as a filter element for discharging to the outside only the air cleaned by removal of fine solid particles from air containing fine dust of an air conditioner or an exhaust gas containing fine solid particles of a combustion engine and as a filter element for discharging to the outside only the liquid cleaned by removal of fine solid particles from a liquid containing fine solid particles such as oil and wastewater.

The filter element can remove fine solid particles contained in a medium to be filtered by originally forming a fine primary filter layer, without having to depend on the formation of a filter layer for dust adhesion like a bag filter, by filling granular polyethylenes composed of a mixture of medium molecular weight polyethylenes and macromolecular weight polyethylenes in a mold, heating and sintering the granular polyethylenes to mold into a rigid filter base, and filling somewhat large pores of the filter base with a filler composed of polytetrafluoroethylene (PTFE) fine powders using a process such as a partial heat treatment. Further, the polytetrafluoroethylene has water and oil repellency, thus the filter can recover filtration ability by removing adhered dust (the aggregate of fine solid particles, etc.) through back washing.

However, as described above, the filter element, which has a construction obtained by heating and sintering granular polyethylenes composed of a mixture of medium molecular weight polyethylenes and macromolecular weight polyethylenes to mold into a filter base and filling pores of the filter base with a filler composed of polytetrafluoroethylene fine powders to form a fine filter layer, become disabled over time due to heat deterioration of the filter base or pulse fatigue deterioration caused by back washing. A filter element filled with the polytetrafluoroethylene fine powders, when it became disabled due to clogging and is discarded by burning, cannot be burnt because the polytetrafluoroethylene fine powders filled on the surface of the base are exposed to high heat and decomposed to a harmful low molecular weight organic fluoride gas such as ethylene tetrafluoride, propylene hexafluoride, and perfluorocyclobutane, thus having an adverse effect on the environment. Therefore, there is no other way than to bury it underground which is only transferring the pollution to the underground. Further, the specific gravity of polytetrafluoroethylene is 2.2, which is heavy, and very nonhydrophilic, thus the dispersion of the suspended fine powders is unstable, and when filling pores of the filter base with polytetrafluoroethylene fine powders, it is difficult for a coating solution having polytetrafluoroethylene fine powders dispersed therein to make an aqueous suspension comprising only a water as a medium thereof, thus the addition of ethyl alcohol or the like is required. In addition, during brush coating or spraying coating, the dispersion solution is required to coat while stirring so that irregularity in coating does not occur.

Further, the filter element in which polytetrafluoroethylene fine powders are used as a filler, requires further improvement in pressure loss (also referred to as "pressure drop") and reducing production cost.

[Patent Document 1] JP 61-502381

An object of the present invention is to provide a filter element and a method for producing the same, which do not generate pollution at the time of a waste disposal, which can be easily produced by easy preparation of the coating solution for filling pores of the filter base, and which improve pressure loss and reduce production cost.

DISCLOSURE OF THE INVENTION

The present inventors have conducted extensive and intensive studies and, as a result, have found that the above-mentioned drawbacks of the prior art can be overcome by adopting the following construction, and thus have completed the present invention. That is, the invention is indicated as follows:

(1) A filter element for separating solid particles from a fluid containing them, wherein ultrahigh molecular weight polyethylene fine powders, which have an average molecular weight of 3,000,000 to 11,000,000 and a bulk specific gravity of 0.15 to 0.29, are the aggregate of primary particles, and are shaped to have voids of 1 to 5 μm in a part where the primary particles are connected, are filled into the pores on the surface of a filter element base made of an open-cell porous molded body prepared by heating and sintering synthetic resin powders, a non-woven fabric or a felt.

(2) The filter element according to the above (1), wherein the ultrahigh molecular weight polyethylene fine powders have an average particle size of from 3 to 150 μm.

(3) The heat-resistive filter element according to the above (1), wherein heat resistance is applied to the filer element by impregnating ultrahigh molecular weight polyethylene fine powder particles with an antioxidant.

(4) A method for producing a filter element for separating solid particles from a fluid containing them, wherein ultrahigh molecular weight polyethylene fine powders, which have an average molecular weight of 3,000,000 to 11,000,000 and a bulk specific gravity of 0.15 to 0.29, are the aggregate of primary particles and are shaped to have voids of 1 to 5 μm in a part wherein the primary particles are connected, are coated with an aqueous suspension dispersed in water together with at least a water dispersible binder and filled into the pores on the surface of a filter element base made of an open-cell porous molded body prepared by heating and sintering synthetic resin powders, a non-woven fabric or a felt.

The filter element of the invention does not generate a harmful gas such as ethylene tetrafluoride, propylene hexafluoride, and perfluorocyclobutane even when discarded by burning.

In the filter element of the invention, a stable coating solution can be easily prepared using ultrahigh molecular weight polyethylene fine powders.

The filter element of the invention in which the coating solution may not use alcohol or the like by using ultrahigh molecular weight polyethylene fine powders, thus the method for producing it is simplified.

In coating polytetrafluoroethylene, there is a great unevenness in the film thickness as the coating has thick or thin according to a coating method. In the case of having thick film, it is not preferable due to increase in an initial pressure loss of the filter element. That is, an excess amount of energy is required for installing and driving, and the filter element may be damaged by pulse air for back washing. In the case of having thin film, powders leak out or an internal filtration is performed instead of a surface filtration, thus causing a continuous increase in pressure loss or the like after driving initiation, whereby reducing the life-cycle of the product. The ultrahigh molecular weight polyethylene fine powders, which are the aggregate of primary particles and are shaped to have voids of 1 to 5 μm in a part where the primary particles are connected, can suppress to a low pressure loss by having suitable voids and coat without having powders leaked out. Unevenness in the thickness can also be reduced according to the coating method. When collecting superfine powders, the coating of polytetrafluoroethylene may be performed twice to thus have good collectability, but due to a high pressure loss in the initial value, excessive driving energy is required. In the same case using the ultrahigh molecular weight polyethylene fine powders, a high collectability is maintained as well as reducing the pressure loss so that an operation is possible using low driving energy.

Unit cost per kg of the ultrahigh molecular weight polyethylene fine powders is inexpensive since it is by half or lower than that of polytetrafluoroethylene, thus cost reduction is possible.

By using the ultrahigh molecular weight polyethylene fine powders, waste disposal of the remaining coating solution after being used in the production process can be discarded by burning instead of burying underground, and in some cases, it can become raw materials for thermal recycle in consideration of environment. Therefore, the disposal cost can also be reduced.

Hereinafter, the embodiments of the filter element and the method for producing thereof according to the invention will be described in detail with reference to suitable drawings.

In the invention, examples of synthetic resin powder materials used for constructing an open-cell porous molded body as a filter element base by filling into a mold, heating and sintering include a thermoplastic resin containing no halogen, such as polyethylene, polypropylene, copolymers of ethylene and propylene, polystyrene and polycarbonate. Examples of synthetic resin fiber materials used for constructing an open-cell porous molded body as a filter element base by heating and molding a nonwoven fabric or a felt also include a synthetic resin containing no halogen, such as polypropylene and polyester.

Further, the size of the pores on the open-cell porous molded body molded by the above synthetic resins is preferably in a range of from 5 to 500 μm, since it is preferable that the average particle size of fine powders which are filled in the pores of the open-cell porous molded body (filter element base) in the subsequent step is in a range of from 3 to 50 μm according to the size of fine solid particles to be filtered by a finished filter element.

It is preferable for the open-cell porous molded body to contain an antioxidant in an amount of from 0.1 to 3 parts by weight, and preferably 0.5 to 1 parts by weight, based on 100 parts by weight of the open-cell porous molded body.

By containing the antioxidant in these ranges, heat resistance in the open-cell porous molded body constituting the filter element base of the invention is improved. For example, in the case where the synthetic resin material of the molded body is polyethylene, continuous usage in the high temperature environment at about 70° C. to 130° C., particularly 90° C. to 110° C. is enabled. When the content of the antioxidant is too small, heat-resistance is insufficiently improved, and when the content of the antioxidant is too large, the cost is increased.

Examples of the antioxidant include a phenol-based antioxidant, an aromatic amine-based antioxidant, a sulfur-based antioxidant, phosphorus-based antioxidant and the like. These antioxidants may be used alone or in combination of two or more.

Specific examples of the antioxidant, for example, as for the phenol-based antioxidant includes a hindered phenol, a high molecular weight hindered phenol, a high molecular weight polycyclic hindered phenol, a monoester-based high molecular weight hindered phenol, a tetraester-based high molecular weight hindered phenol, a diester-based high molecular weight hindered phenol, and the like, and as for the aromatic amine-based antioxidant includes aralkylated diphenylamines, a phenylenediamine-based antoxidant, a dihydroquinoline-based antioxidant and the like. Further, examples of the sulfur-based antioxidant include a tetraester-based high molecular weight peroxide decomposer, a thioether-based peroxide decomposer and the like, and examples of the phosphorus-based antioxidant include phosphite, tris (mononoylphenyl, dinonylphenyl)phosphite, TNP (trisnonylphenylphosphite), alkylallylphosphite, trialkylphosphite, allylphosphite and the like.

Among the antioxidants, the phenol-based high molecular weight hindered phenol is particularly preferred.

Further, the phenol-based antioxidant has an effect of particularly preventing radical-type decomposition deterioration that is the main factor causing embrittlement of the synthetic resin by thermal oxidation deterioration. The aromatic amine-based antioxidant has excellent oxidation resistance due to a long induction period of oxygen absorption. The sulfur-based antioxidant hinders embrittlement and coloration of the synthetic resin by decomposing into an inactive compound. Especially, when the sulfur-based antioxidant is used in a combination of the phenol-based antioxidant, protection against oxidation is greatly improved by a synergic effect. The phosphorus-based antioxidant has effects of coloration inhibition, improvement in stable processing, and inactivation of a catalyst residue in the resin as well as protection against oxidation deterioration; for example, in the case of having a coloration problem from the phenol-based antioxidant or an odor problem from the sulfur-based antioxidant, by using these phosphites as a substitute the problems may be easily solved.

The ultrahigh molecular weight polyethylene fine powders filled in the pores of the open-cell porous molded body have an average molecular weight of 3,000,000 to 11,000,000 and a bulk specific gravity of 0.15 to 0.29, are the aggregate of primary particles and are shaped to have voids of 1 to 5 μm in a part where the primary particles are connected. It is preferable that an average particle size of the ultrahigh molecular weight polyethylene fine powders is from 3 to 150 μm. Such ultrahigh molecular weight polyethylene fine powders may be exemplified in the form of a bunch of grapes or cauliflower as shown by the electro-microscope in FIG. 5.

The primary particle size of the ultrahigh molecular weight polyethylene fine powders is in a range of from 3 to 10 μm.

A method of preparing the ultrahigh molecular weight polyethylene fine powders is not particularly limited, but a Ziegler method of polymerization technique or the like is preferred.

Further, it is preferable to apply heat resistance by impregnating ultrahigh molecular weight polyethylene fine powder particles with the above-described antioxidants.

Hereinafter, the process of producing the filter element of the invention will be illustrated.

First, an open-cell porous molded body is molded by heating and sintering synthetic resin powders, a nonwoven fabric or a felt.

As for a step of molding the open-cell porous molded body by heating and sintering synthetic resin powders, for example, a step of forming the open-cell porous molded body having an integrated structure by filling the synthetic resin powders in a mold and heating the mold so that the synthetic resin powders partially adhere to each other at the surface thereof can be exemplified. The mold, for example, is made of a heat resistant aluminum alloy, and the inner surface of the mold is made to fit the form of the open-cell porous molded body. Further, the filling at this time is generally performed with vibration. However, the amplitude and the frequency of the vibration are not particularly limited.

The mold filled with the synthetic resin powder, for example, is heated in a heating oven, and the heating temperature is higher than the melting point of the synthetic resins which are main components of the synthetic resin powders, and preferably 50° C. higher than the melting point. In addition, the heating is performed at a temperature in a range where the synthetic resin powers do not substantially flow but retain their shape while heating. The temperature range differs depending on the type of synthetic resins. Especially, in the case of polyethylene, the temperature differs with the molecular weight, and the higher the molecular weight, that is, the higher the viscosity number, fluidization is difficult to occur even heated at high temperature, thus the synthetic resin powder can retain its form.

However, the heating temperature is set preferably at 250° C. or lower, and more preferably 240° C. or lower. Heating at the temperature exceeding 250° C., high oxidation deterioration of the synthetic resin power occurs so that it is difficult to form an open-cell porous molded body The heating time depends on the viscosity number and heating temperature of the synthetic resin powers, and is appropriately set so as to form a good open-cell porous molded body. In general, the heat treatment is performed for 1 to 6 hours, and preferably 1.5 to 3 hours.

After heating for a predetermined time, the molds are taken out from the heating oven and sufficiently cooled, and then the molding is taken out from the mold. Thereby, an integrated open-cell porous molded body can be obtained by having the synthetic resin powder melted and adhered partially on its surface, and has sufficient intensity and suitable degree of porosity. Further, the molded filter element base has flexibility and has strong resistance against external force.

When molding an open-cell porous molded body, an antioxidant can be incorporated into the open-cell porous molded body by containing the antioxidant in the synthetic resin powder.

In order to contain an antioxidant in the synthetic resin powder, first, a step of dispersing a predetermined amount of a powdered antioxidant into the synthetic resin powders is performed. The step can be performed using any conventional mixer for dry blending resins with additives, such as a tumbler mixer, a Henschel mixer, a plowshare mixer, and a Redige mixer. In this step, a mixture consisting of synthetic resin powders and an antioxidant dispersed therein is obtained. The antioxidant herein may be mixed with the synthetic resin particles by dissolving in a low-boiling organic solvent such as tetrahydrofuran, methyl ethyl ketone, methyl isobutyl ketone, and acetone. After mixing, the solvent is removed.

Subsequently, a step of infiltrating the antioxidant dispersed in the synthetic resin powder into the synthetic resin powder is carried out. In this step, the mixture is heated to a temperature which is higher than the melting point where the antioxidant liquefies and is in the range where the synthetic resin powders substantially retain their shape, preferably to a temperature higher than the melting point of the antioxidant and lower than the melting point of the synthetic resin powder. The mixture is retained at a temperature for 15 to 120 minutes, and more preferably for 30 to 120 minutes, thus the antioxidant is infiltrated into the synthetic resin powder. Heating for infiltrating the antioxidant into the synthetic resin powder, for example, may be heated in a heating oven before filling the synthetic resin powder in a mold or may be heated in a heating oven after filling the synthetic resin powder in a mold.

Then, a step of forming an ultrahigh molecular weight polyethylene fine powders coating layer on the surface of the open-cell porous molded body obtained above, that is, a step of surface-treating is carried out.

The above-obtained open-cell porous molded body itself can be used as a filter element. However, as schematically shown the surface of the filter element according to the invention in FIG. 1, the open-cell porous molded body is the aggregate of the synthetic resin powders A which form the skeleton, and a plurality of somewhat large voids B of 50 to 500 μm exist inside the open-cell porous molded body, thus when used as a filter, fine powdered dusts C are leaked out. For its prevention, a fine particle layer, that is, the coating layer D of ultrahigh molecular weight polyethylene fine powders having voids of 1 to 5 μm is formed on the surface of the open-cell porous molded body, thereby improving a filtration efficiency.

As a process of forming the coating layer of ultrahigh molecular weight polyethylene fine powders, for example, the step of heating after spraying and coating a suspension solution, which is a mixture of water and synthetic resin such as polyvinyl acetate as a binder to the ultrahigh molecular weight polyethylene fine powders, on the surface of the open-cell porous molded body. A heating temperature for fixing the ultrahigh molecular weight polyethylene fine powders on the surface of the open-cell porous molded body by the binder, after spraying and coating the suspension solution, is preferably from 40 to 60° C., and the heating time is preferably 90 to 150 minutes.

By adding an antioxidant to the ultrahigh molecular weight polyethylene fine powders, heat resistance of the filter element may be improved. As a step for adding an antioxidant to the ultrahigh molecular weight polyethylene fine powders, for example, the same process for adding an antioxidant to the synthetic resin powder may be mentioned.

The filter element of the invention produced by the above steps has the surface as shown in the electro-microscopic photograph of FIG. 6, has the cross-sectional structure of the surface part as shown in the electro-microscopic photograph of FIG. 7, and the voids formed by the ultrahigh molecular weight polyethylene fine powders are 1 to 5 μm.

On the other hand, the filter element, which used polytetrafluoroethylene as a filler, has the surface as shown in the electro-microscopic photograph of FIG. 8, has the cross-sectional structure of the surface part as shown in the electro-microscopic photograph of FIG. 9, and the voids formed on the surface is small.

The filter element of the invention, by having the surface structure as the above, has less pressure loss and less initial leak.

An example of a schematic construction of a dust collector in which the filter element 24 of the invention is installed is shown in FIG. 2. The dust collector 10 has a sealed casing 12, wherein it is divided into a lower dust chamber 16 and an upper clean air chamber 18 by an upper top panel 14 used as a partition wall. Installed in the middle part of the casing 12 is a dust-containing air supply port 20 communicating with the lower dust chamber 16 and installed in the upper part of the casing 20 is a clean air exhaust port 22 communicating with the upper clean air chamber 18. Further, on the lower surface of the upper top panel 14, hollow planar-shaped filter elements 24 are mounted with a predetermined space therebetween. Installed in the lower part of the casing 12 is a hopper 26, which discharges discarded powdered dust, and a dust vent 28 for the powdered dust.

On the upper part of the filter element 24, as illustrated the simplified exterior view in FIG. 3, a large radial part 32 is formed, and the large radial part 32 is formed in an inflated shape so as to contain a frame 34. Each end of the frame 34 contained in the large radial part 32 together with the large radial part 32 is fixed to the upper top panel 14 using the fixation bolt 36. Also, a filling 38 is interposed in between the upper top panel 14 and the frame 34.

Further, as illustrated in the perspective view in FIG. 4 of the P-P cross-section surface of filter element 24 of FIG. 3, the inner part of the filter element 24 is formed of a plurality of hollow chambers 24a whose upper part is opened, and the dust adhesive surface of the element is in corrugated sheet shape or bellows shape, thus the adhesive surface area is enlarged.

The dust-containing air supplied from the supply opening 20 to the dust chamber 16 of the casing 12 is passed through the filter of the hollow shape filter element 24 and flowed into the inner side. The powdered dust herein is collected on the surface of the filter element 24 by adhesion and deposition, and the clean air flowed into the inner side of the filter element 24 is passed through the passage of the frame 34 and entered into the upper clean air chamber 18 of the casing 12, where the clean air is guided to a predetermined place from the clean air exhaust port 22.

When the powdered dust adheres and deposits on the surface of the filter element 24, the air passage is clogged and the pressure loss is increased. Therefore, each filter element 24 is sequentially back washed with a constant time interval so as to remove the adhered and deposited powdered dust from the surface of the filter element 24. That is, given a constant term in between using the timer controller or the like, back wash valves (not shown) are opened subsequently, whereby the pulse air for back washing is dispersed from the corresponding dispersion tube, respectively. Thereby, the pulse air backflows from the inner side of each filter element 24 toward the outer side thereof, and shakes off the adhered and deposited powdered dust from the surface of the filter element 24 in a deposited form without being scattered. The shaken dust is collected from the dust vent 28 through the hopper 26.

The filter element 24 of the invention may be formed in a shape of a cylinder, a box, or a box having its cross-section surface corrugated in order to enlarge the surface area.

BRIEF DESCRIPTION OF THE DRAWINGS

FIG. 11 is a graph showing results of the concentration test of dust contained in the initial leak, for the filter element of the invention and the filter element of the Comparative Example.

REFERENCE NUMERALS

A synthetic resin powders
B voids
C dust
D ultrahigh molecular weight polyethylene fine powders (coating layer)
10 dust collector
12 casing
24 filter element

BEST MODE FOR CARRYING OUT THE INVENTION

Hereinafter, the invention will be described in detail by way of Examples, which are not intended to limit the invention in any way.

EXAMPLE 1

Figure 1:
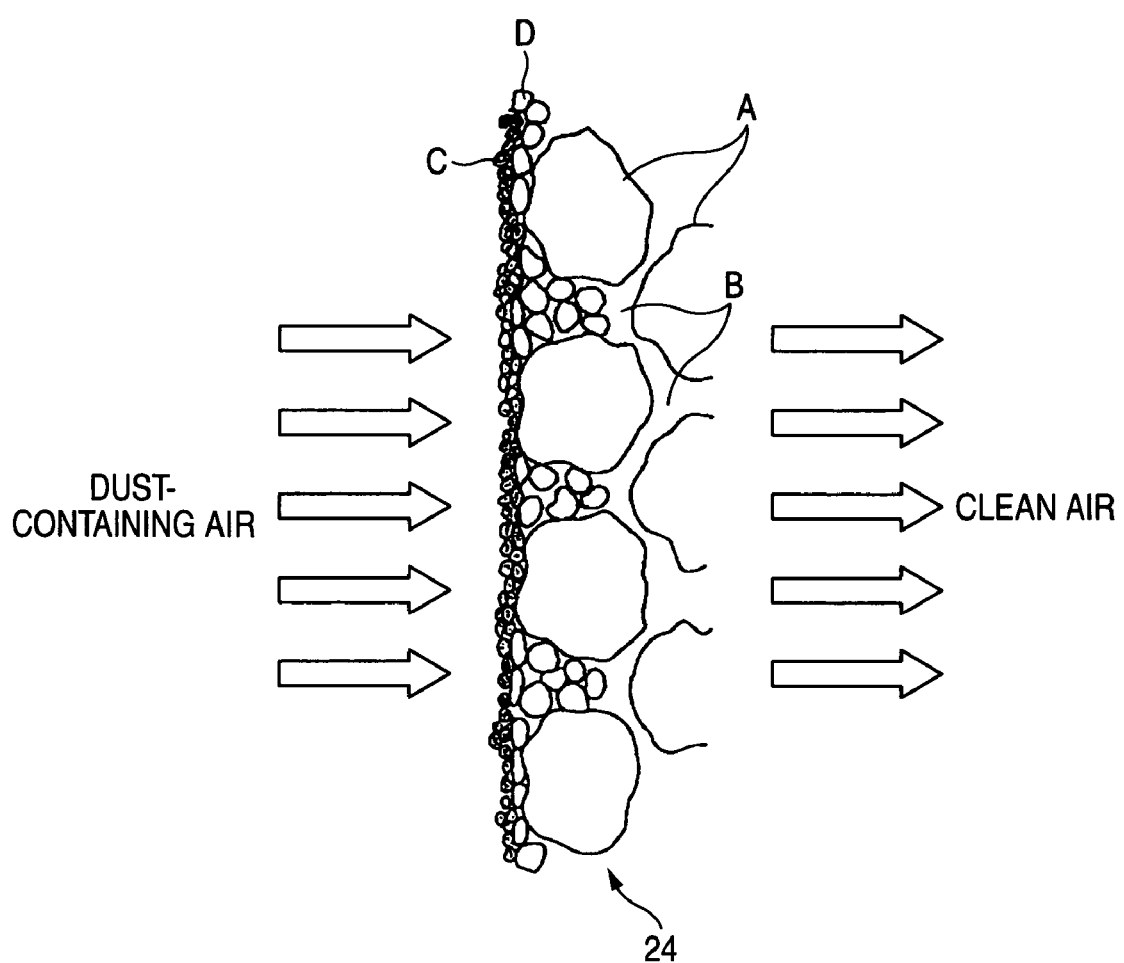
FIG. 1 is a view schematically showing the surface of a filter element surface according to the present invention.
Figure 2:
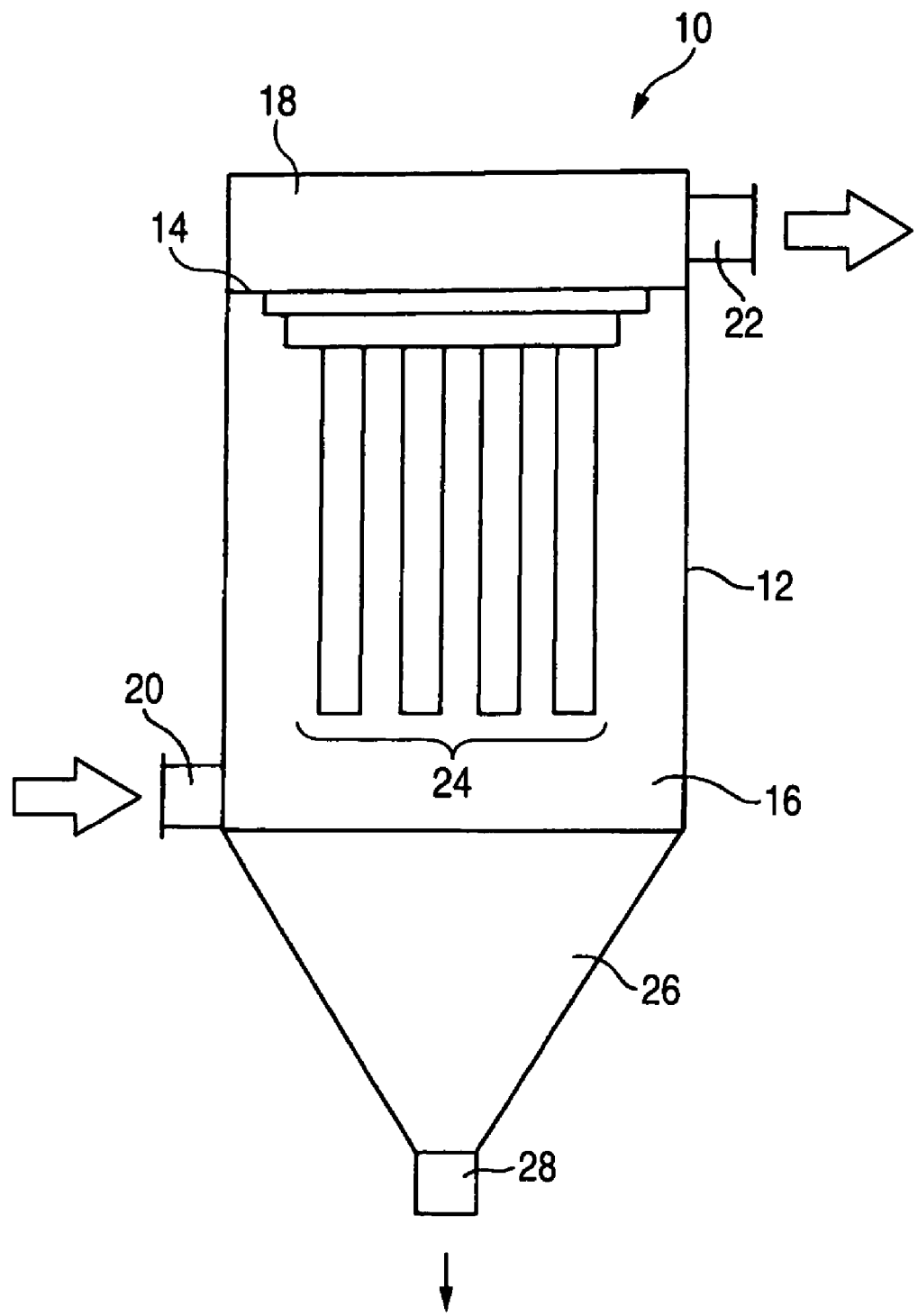
FIG. 2 is a view showing the schematic construction of a dust collector in which the filter element of the invention is installed.
Figure 3:
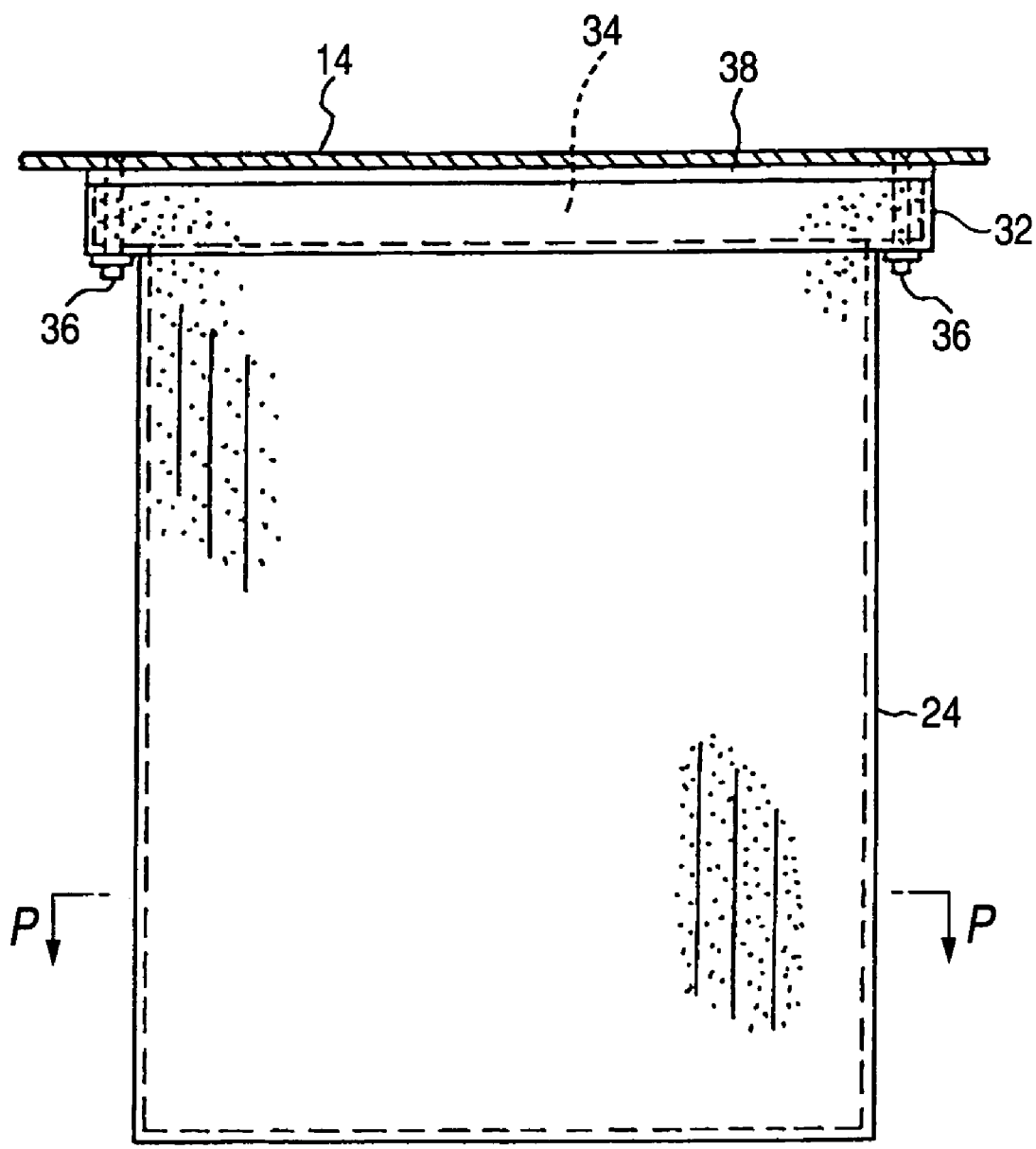
FIG. 3 is a view showing the schematic appearance of the filter element of the invention.
Figure 4:
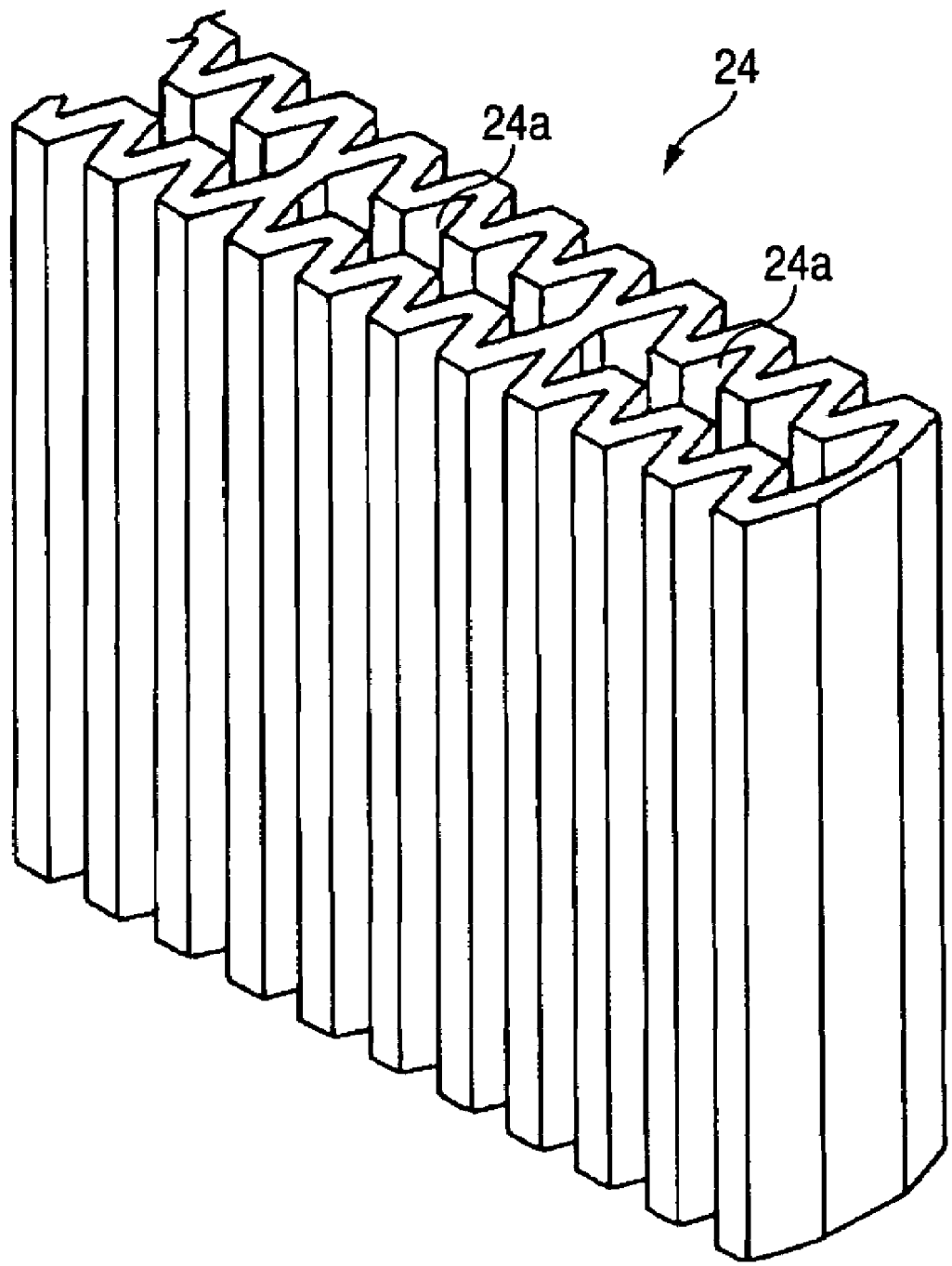
FIG. 4 is a perspective view showing the P-P cross-section of the filter element shown in FIG. 3.
Figure 5:
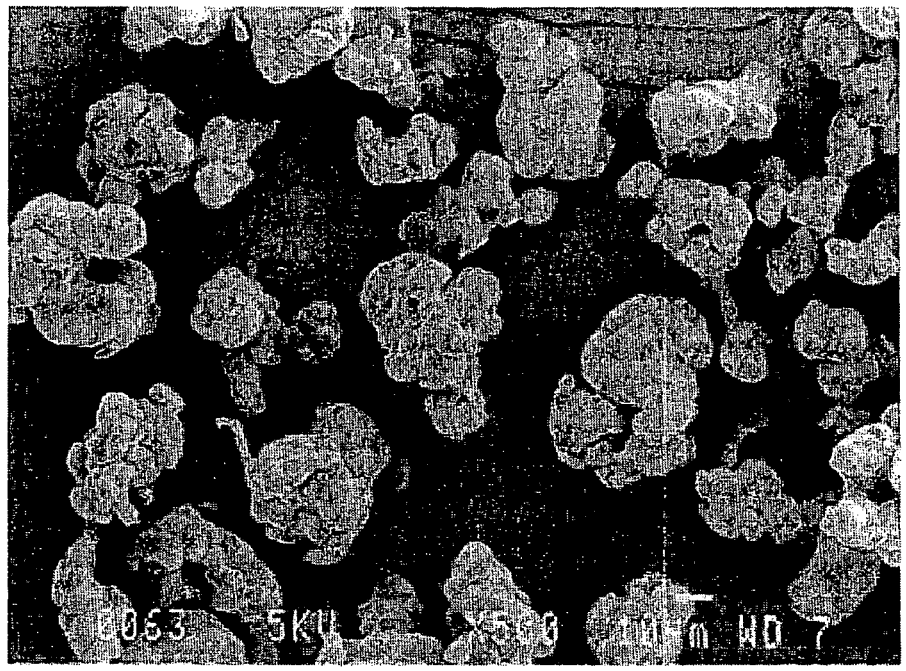
FIG. 5 is an electron microscope photograph showing the form of ultrahigh molecular weight polyethylene fine powders according to the invention.
Figure 6:
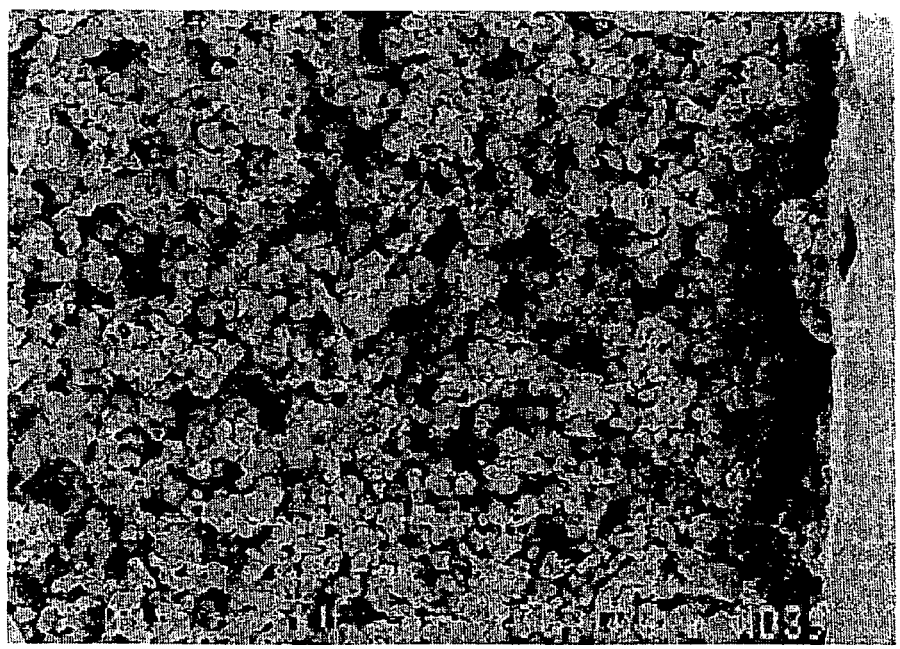
FIG. 6 is an electron microscope photograph showing the surface of the filter element according to the invention.
Figure 7:
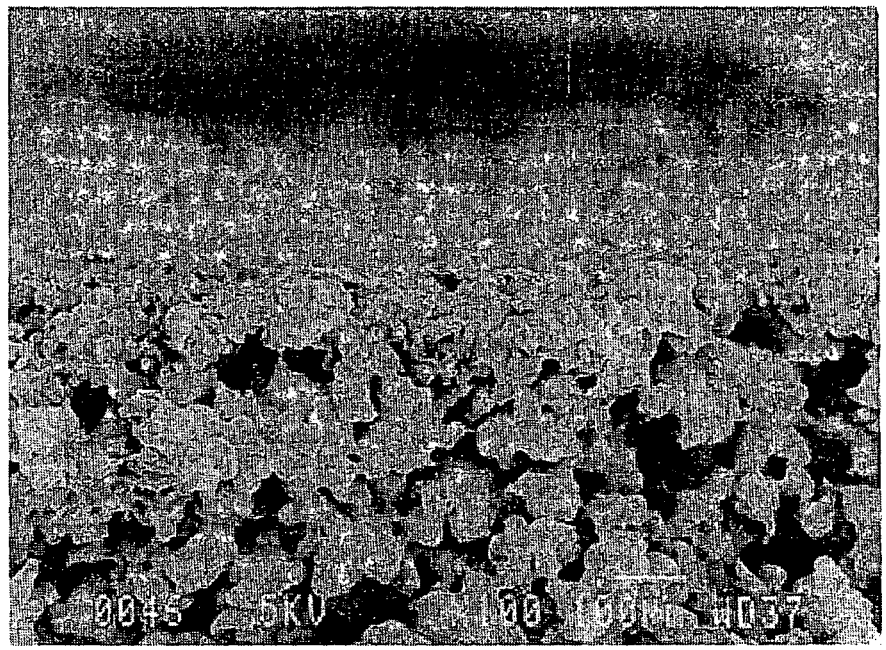
FIG. 7 is an electron microscope photograph showing the cross-sectional structure of the surface portion of the filter element according to the invention.
Figure 8:
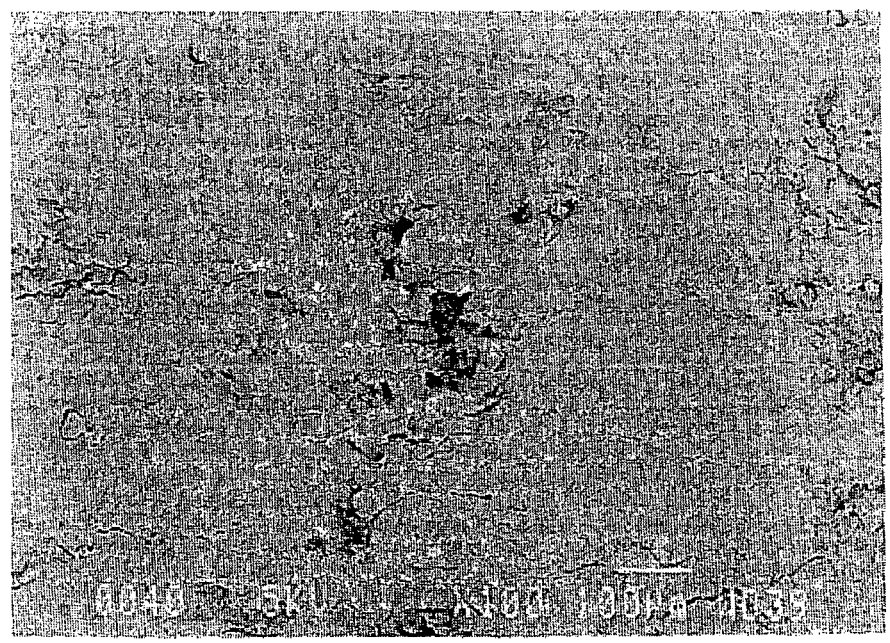
FIG. 8 is an electron microscope photograph showing the surface of the filter element in which polytetrafluoroethylene fine powders are used as a filler.
Figure 9:
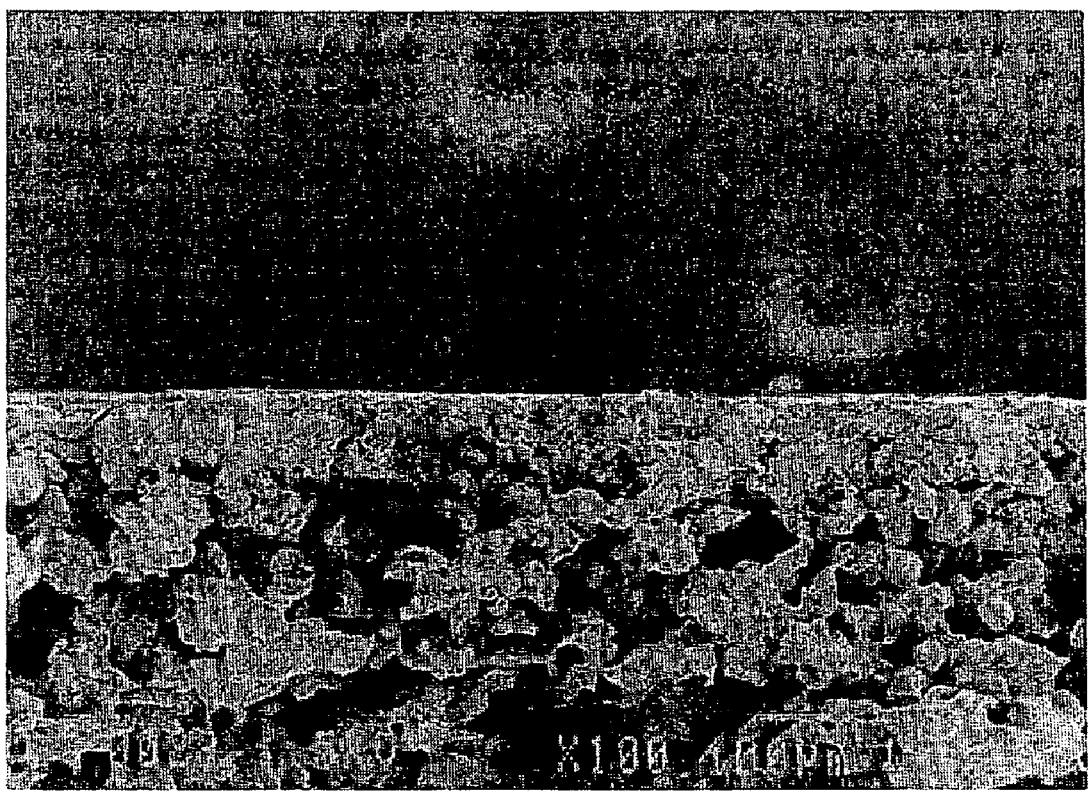
FIG. 9 is an electron microscope photograph showing the cross-sectional structure of the surface of the filter element in which polytetrafluoroethylene fine powders are used as a filler.

A high-density polyethylene resin powder with density of 0.95 g/ml and melt index number of 0.1 g/10 min with the average particle size of 300 μm was filled in a mold, and by heating at 230° C. for 2 hours and sintering, an open-cell porous molded body, as shown in FIG. 3, was molded having the thickness of 62 mm, width of 500 mm and height of 500 mm. The size of the pores on the surface of the filter element base was measured using a laser microscope, and the resulting average size of the pore was 85 μm.

Components comprising 20.6 parts by weight of ultrahigh molecular weight polypropylene fine powders, which have an average molecular weight of 4,500,000, a raw material density of 0.93 g/ml, an average particle size of 30 μm, a bulk specific gravity of 0.25 or less, are the aggregate of primary particles, and are shaped to have voids of 1 to 5 μm in a part where the primary particles are connected; 4.5 parts by weight of polyvinyl acetate; and 74.9 parts by weight of ion-changed water were stirred with a homomixer at 5,000 rpm for 10 minutes. The thus obtained coating solution was coated on the surface of the filter element base using a brush. Then, it was retained in an electric oven of 50° C. for 2 hours, and the adhesion action of polyvinyl acetate was expressed. Thereby, the ultrahigh molecular weight polyethylene fine powders were filled and fixed in the pores on the surface of the filter element base whereby the filter element of the invention was finished.

COMPARATIVE EXAMPLE 1

The filter element of Comparative Example was finished in the same manner as in Example 1, except that polytetrafluoroethylene powders having an average particle size of 3.6 μm and a bulk specific gravity of 0.28 g/ml were used, which were filled and fixed in the pores on the surface of the filter element base, instead of the above-described ultrahigh molecular weight polyethylene fine powders.

When the filter element of the invention and the filter element of Comparative Example were tested for air permeability via [JIS L 1096: 1999 (Fabric), entitled "General Fabric Testing Method" 8.27, Air Permeability, 8.27.1, Method A (Fragile-type method)], it was clear that the filter element of the invention had excellent air permeability as shown in Table 1.

TABLE 1

Measurement Result of Air Permeability

| | Air Permeability cm³/cm² · sec | | Fraction of Before/After Coating |
|---|---|---|---|
| | Before Coating | After Coating | |
| Filter Element of Comp. Ex. | 4.65 | 1.35 | 29% |
| Filter Element of the invention | 4.65 | 2.63 | 57% |

Figure 10:
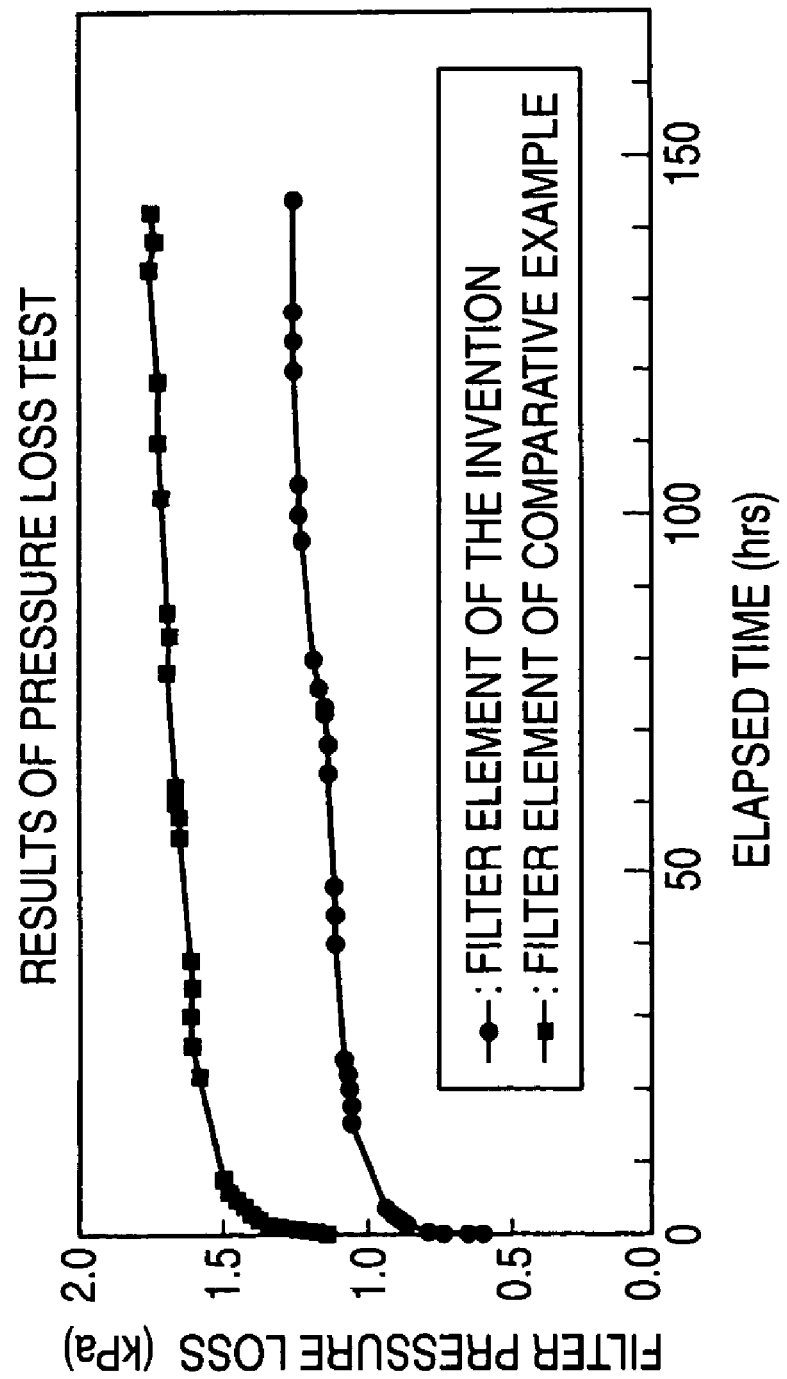
FIG. 10 is a graph showing results of the pressure loss test in the filter element of the invention and the filter element of Comparative Example.

The filter element of the invention and the filter element of the Comparative Example were tested for the pressure loss (filtration velocity: 1 m/min, pulse air for back washing: 0.49 MPa per 120 sec, dust-containing concentration: 5 g/m³ (calcium carbonate D50=10.4 μm)), and the results were as illustrated in FIG. 10.

The filter element of the invention and the filter element of the Comparative Example were tested for the initial leaked dust concentration under the same condition as above, and the results were as illustrated in FIG. 11.

From the results of FIGS. 10 and 11, it was clear that the filter element of the invention was stable in the low value for the pressure loss without increasing continuously, had no big difference in the initial leak with the filter element of the Comparative Example, and had high collectabillity.

INDUSTRIAL APPLICABILITY

According to the invention, it is possible to provide a filter element, which does not generate pollution at the time of a waste disposal, which can be easily produced by easy preparation of the coating solution for filling pores of the filter base, and which improves pressure loss and reduces production cost.

The invention claimed is:

1. A filter element for separating solid particles from a fluid containing the solid particles, which comprises an open-cell porous molded body as a filter element base and ultrahigh molecular weight polyethylene fine powders, wherein the ultrahigh molecular weight polyethylene fine powders have an average molecular weight of 3,000,000 to 11,000,000 and a bulk specific gravity of 0.15 to 0.29;

wherein the ultrahigh molecular weight polyethylene fine powders form an aggregate of primary particles, wherein the aggregates are in the shape of a bunch of grapes or a cauliflower, and wherein the aggregates have voids of 1 to 5 μm in a part where the primary particles are connected; and wherein the ultrahigh molecular weight polyethylene fine powders are filled in or coated into pores on the surface of the open-cell porous molded body; wherein the open-cell porous molded body is prepared by heating and sintering synthetic resin powders, a non-woven fabric or a felt.

2. The filter element according to claim 1, wherein the ultrahigh molecular weight polyethylene fine powders have an average particle size of from 3 to 150 μm.

3. The filter element according to claim 1, wherein the ultrahigh molecular weight polyethylene fine powder further contains an antioxidant, which is impregnated into the ultrahigh molecular weight polyethylene find powder by heating, to improve its heat resistance.

4. A method for producing a filter element for separating solid particles from a fluid containing the solid particles, which comprises providing a filter element base by heating and sintering synthetic resin powders, a non-woven fabric or a felt to produce an open-cell porous molded body; and applying a suspension solution containing ultrahigh molecular weight polyethylene fine powders, water, and a water-dispersible binder to the surface of the open-cell porous molded body, followed by heating, wherein the ultrahigh molecular weight polyethylene fine powders, have an average molecular weight of 3,000,000 to 11,000,000 and a bulk specific gravity of 0.15 to 0.29;

wherein the ultrahigh molecular weight polyethylene fine powders are in the form of an aggregate of primary particles, wherein the aggregates are in the shape of a bunch of grapes or a cauliflower, and have voids of 1 to 5 μm in a part wherein the primary particles are connected.

* * * * *